United States Patent
Nam et al.

(10) Patent No.: US 9,253,466 B2
(45) Date of Patent: Feb. 2, 2016

(54) 3D DISPLAY APPARATUS PREVENTING IMAGE OVERLAPPING

(75) Inventors: Seung Seok Nam, Yongin (JP); Yunki Baek, Gunpo (JP)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 539 days.

(21) Appl. No.: 13/410,552

(22) Filed: Mar. 2, 2012

(65) Prior Publication Data

US 2013/0083006 A1   Apr. 4, 2013

(30) Foreign Application Priority Data

Oct. 4, 2011 (KR) ........................ 10-2011-0100770

(51) Int. Cl.
*G06T 15/00* (2011.01)
*H04N 13/00* (2006.01)

(52) U.S. Cl.
CPC ................................. *H04N 13/0011* (2013.01)

(58) Field of Classification Search
None
See application file for complete search history.

(56) References Cited

U.S. PATENT DOCUMENTS

| | | | | |
|---|---|---|---|---|
| 5,963,664 A * | 10/1999 | Kumar et al. | .................. | 382/154 |
| 6,366,281 B1 * | 4/2002 | Lipton et al. | .................. | 345/419 |
| 6,975,756 B1 * | 12/2005 | Slabaugh et al. | ............. | 382/154 |
| 8,477,175 B2 * | 7/2013 | Shaffer et al. | .............. | 348/14.08 |
| 2004/0222987 A1 * | 11/2004 | Chang et al. | ................... | 345/419 |
| 2005/0129325 A1 * | 6/2005 | Wu | .............................. | 382/254 |
| 2010/0026712 A1 * | 2/2010 | Aliprandi et al. | ............. | 345/629 |
| 2010/0053310 A1 * | 3/2010 | Maxson et al. | ................. | 348/51 |
| 2010/0194858 A1 * | 8/2010 | Lim et al. | ........................ | 348/46 |
| 2010/0302351 A1 | 12/2010 | Yanamoto | | |
| 2012/0013651 A1 * | 1/2012 | Trayner et al. | ................. | 345/690 |
| 2013/0003128 A1 * | 1/2013 | Watanabe | .................... | 358/1.15 |

FOREIGN PATENT DOCUMENTS

| | | |
|---|---|---|
| KR | 10-0267259 | 10/2000 |
| KR | 10-0590025 | 6/2006 |
| KR | 10-0597584 | 6/2006 |

OTHER PUBLICATIONS

English Abstract for Publication No. 10-0267259.
English Abstract for Publication No. 10-0597584.

* cited by examiner

*Primary Examiner* — Stephen R Koziol
*Assistant Examiner* — Jason Pringle-Parker
(74) *Attorney, Agent, or Firm* — F. Chau & Associates, LLC

(57) ABSTRACT

A method for displaying a three-dimensional (3D) image in a display panel of a 3D display device is provided. The method includes generating M images corresponding to a maximum disparity in response to input two-dimensional (2D) images and disparity information of the respective 2D images. The 2D images include a left-side image and a right-side image. The method further includes selecting N images from among the M images, providing the selected N images to a display unit, and displaying the provided N images using the display panel.

18 Claims, 6 Drawing Sheets

3D DISPLAY APPARATUS PREVENTING IMAGE OVERLAPPING

CROSS-REFERENCE TO RELATED APPLICATIONS

This application claims the benefits, under 35 U.S.C §119, of Korean Patent Application No. 10-2011-0100770 filed Oct. 4, 2011, the contents of which are herein incorporated by reference in their entirety.

BACKGROUND

1. Technical Field

The present disclosure relates to a three-dimensional display device, and more particularly, to a three-dimensional display device capable of substantially preventing an image overlapping phenomenon.

2. Discussion of Related Art

Binocular disparity refers to a difference in a perceived location of an object seen from two different view points, e.g., by the left and right eyes, resulting from a horizontal separation of the view points. Binocular disparity may enable a user to see an object in three dimensions. As left-eye and right-eye images are merged by the brain of the user, the user may perceive a three-dimensional effect.

SUMMARY

According to an exemplary embodiment of the inventive concept a three-dimensional (3D) display device comprises a display unit configured to display images, and an intermediate image generating unit configured to generate M images corresponding to a maximum disparity in response to input two-dimensional (2D) images and disparity information of the respective 2D images, wherein the intermediate image generating unit selects N images from among the M images, and provides the selected images to the display unit.

According to an exemplary embodiment, the 3D display device further comprises a user position measuring unit configured to measure a user position, and the intermediate image generating unit selects the N images in response to the user position.

According to an exemplary embodiment, the intermediate image generating unit comprises an image input unit configured to receive the 2D images including a left-side image and a right-side image and disparity information of the respective left-side and right-side images, a shift value deciding unit configured to determine a shift value in response to the disparity information of the respective left-side and right-side images, a first intermediate image generating unit configured to generate a plurality of first images using the left-side image and the disparity information of the left-side image and the shift value, a second intermediate image generating unit configured to generate a plurality of second images using the right-side image and the disparity information of the right-side image and the shift value, an image composing unit configured to generate the M images using the plurality of first images and the plurality of second images, and a selection unit configured to select the N images from among the M images according to the user position, wherein the N images correspond to N continuous views.

According to an exemplary embodiment, the shift value deciding unit comprises a maximum disparity measuring unit configured to measure the maximum disparity in response to disparity information of the left-side and right-side images, an intermediate image number deciding unit configured to determine a number of intermediate images to be generated in response to the maximum disparity, and a disparity look-up table comprising a storage device storing a shift value corresponding to the number of intermediate images to be generated, wherein the disparity information of the left-side and right-side images includes a plurality of pixel disparity information, and the disparity look-up table provides the first and second intermediate image generating units with the shift value in response to the plurality of pixel disparity information provided from the first and second intermediate image generating units.

According to an exemplary embodiment, each of the first intermediate image generating unit and the second intermediate image generating unit comprises a filter unit configured to filter a noise of the disparity information of the respective left-side image or right-side image, an image shifter configured to shift the respective left-side image or right-side image by the number of intermediate images in response to the shift value, and a hole processing unit configured to process a hole of images shifted by the image shifter, wherein the image shifter provides the disparity look-up table with a plurality of pixel disparity information of the disparity information of the respective filtered left-side image or right-side image as addresses, and the disparity look-up table provides the image shifter with the shift value.

According to an exemplary embodiment, the hole processing unit of the first intermediate image generating unit or the second intermediate image generating unit processes a hole using an image background color and images, shifted by the image shifter of the first intermediate image generating unit and the second intermediate image generating unit, respectively.

According to an exemplary embodiment, the hole processing unit of the first intermediate image generating unit and the second intermediate image generating unit processes a hole using an image background color and images, shifted by the image shifter of the second intermediate image generating unit or the first intermediate image generating unit, respectively.

According to an exemplary embodiment, the plurality of first images includes the left-side image and images hole-processed by the hole processing unit of the first intermediate image generating unit.

According to an exemplary embodiment, the plurality of second images includes the right-side image and images hole-processed by the hole processing unit of the second intermediate image generating unit.

According to an exemplary embodiment, the image composing unit generates the M images using the left-side and right-side images provided via the hole processing units of the first and second intermediate image generating units and images hole-processed by the hole processing units of the first and second intermediate image generating units.

According to an exemplary embodiment, upon generating of an image corresponding to one view, the image composing unit composes images under a condition that a weight is given to the hole-processed images in inverse proportion to a ratio of a distance between the one view and a leftmost view and a distance between the one view and a rightmost view.

According to an exemplary embodiment, a value of M is proportional to a range of the maximum disparity.

According to an exemplary embodiment, a value of M is greater than or equal to a value of N.

According to an exemplary embodiment, a value of M is 15 and a value of N is 9.

According to an exemplary embodiment, the selection unit selects N images, corresponding to N views from the leftmost view, from among the M images upon determining that the user position is measured within five views from a leftmost view.

According to an exemplary embodiment, the selection unit selects N images, corresponding to N views from the rightmost view, from among the M images upon determining that the user position is measured within five views from a rightmost view.

According to an exemplary embodiment, the selection unit selects N images, corresponding to N views from a fourth view on the left side or a fourth view on the right side on the basis of the user position, from among the M images upon determining that the user position is measured at a view greater than five views from a leftmost view and greater than five views from a rightmost view.

According to an exemplary embodiment, the intermediate image generating unit comprises an image input unit configured to receive the 2D images including a left-side image, a right-side image, and a center image, and disparity information of the respective left-side, right-side, and center images, a first shift value deciding unit configured to determine a first shift value in response to the disparity information of the respective left-side and center images, a second shift value deciding unit configured to determining a second shift value in response to the disparity information of the respective right-side and center images, a first intermediate image generating unit configured to generate a plurality of first images using the left-side image and the disparity information of the left-side image and the first shift value, a second intermediate image generating unit configured to generate a plurality of second images using the center image and the disparity information of the center image and the first shift value, a third intermediate image generating unit configured to generate a plurality of third images using the center image and the disparity information of the center image and the second shift value, a fourth intermediate image generating unit configured to generate a plurality of fourth images using the right-side image and the disparity information of the right-side image and the second shift value, a first image composing unit configured to generate a plurality of fifth images using the plurality of first images and the plurality of second images, a second image composing unit configured to generate a plurality of sixth images using the plurality of third images and the plurality of fourth images, and a selection unit configured to receive the plurality of fifth images and the plurality of sixth images, wherein the selection unit is further configured to select N images from among M images other than a duplicated image of the input images, according to the user position, wherein the N images correspond to N continuous views.

According to an exemplary embodiment of the inventive concept, a 3D display device comprises a display unit configured to display images, a user position measuring unit configured to measure a user position, and an intermediate image generating unit configured to generate a plurality of images to provide the plurality of images to the display unit, wherein the intermediate image generating unit comprises a shift value deciding unit configured to determine a shift value in response to disparity information of each of a left-side image and a right-side image, a first intermediate image generating unit configured to generate N first images using the left-side image, the disparity information of the left-side image, and the shift value, a second intermediate image generating unit configured to generate N second images using the right-side image, the disparity information of the right-side image, and the shift value, and an image composing unit configured to generate N third images using the first and second images, and wherein the first intermediate image generating unit generates N first images corresponding to N selected views in response to the user position, and the second intermediate image generating unit generates N second images corresponding to N selected views in response to the user position.

According to an exemplary embodiment, the first intermediate image generating unit and the second intermediate image generating unit each comprise a filter unit configured to filter a noise of the respective disparity information, a view deciding unit configured to generate N view information in response to the user position, an image shifter configured to generate N shifted images corresponding to N views in response to the N view information, and a hole processing unit configured to fill a hole of the shifted images, wherein the image composing unit generates N images using hole-filled images provided from the hole processing unit and images provided from the second intermediate image generating unit or the first intermediate image generating unit, respectively, and the image shifter shifts the respective left-side image or right-side image according to the shift value.

According to an exemplary embodiment of the inventive concept, a method for displaying a three-dimensional (3D) image comprises receiving a plurality of two-dimensional (2D) images and disparity information of the respective 2D images, generating M intermediate images corresponding to a maximum disparity in response to the plurality of 2D images and the disparity information of the respective 2D images, and selecting N images to be displayed from among the M images.

According to an exemplary embodiment, a method includes measuring a user position, wherein the N images are selected in response to the user position.

According to an exemplary embodiment, the plurality of 2D images comprise a left-side image and a right-side image, and a method includes determining a shift value in response to the disparity information of the respective left-side and right-side images, generating a plurality of first images using the left-side image and the disparity information of the left-side image and the shift value, generating a plurality of second images using the right-side image and the disparity information of the right-side image and the shift value, determining a number of the M intermediate images to be generated according to the shift value, and generating the M images using the plurality of first images and the plurality of second images.

BRIEF DESCRIPTION OF THE FIGURES

Exemplary embodiments of the present disclosure will become apparent from the following description with reference to the following figures, wherein like reference numerals refer to like parts throughout the various figures unless otherwise specified, and wherein.

DETAILED DESCRIPTION OF EXEMPLARY EMBODIMENTS

Hereinafter, exemplary embodiments of the present disclosure will be explained detail with reference to the accompanying drawings.

Various three-dimensional (3D) display devices have been developed based on the concept of binocular disparity (or, a stereo binocular disparity). However, in certain cases a view may be limited to a right eye and a left eye. That is, when left and right eyes of a viewer are located at two views, the viewer may perceive an object displayed on a panel in three dimensions. If a viewing region is limited, such as by an out of focus condition, the viewer may not perceive a three-dimensional effect. A multi-view 3D display device has been developed as a potential solution to the problem of limited viewing regions.

The multi-view 3D display device may receive a left-side image, disparity information of the left-side image, a right-side image, and disparity information of the right-side image to generate an intermediate image using the received left-side and right-side images and disparity information of the left-side and right-side images.

The general multi-view 3D display device may use a display panel, which displays images corresponding to multiple views, e.g., nine views. The nine view of the three-dimensional image of a nine-view display panel may include one left-side image, one right-side image, and seven intermediate images. That is, seven intermediate images may exist between the left-side image and the right-side image. A disparity between left-side and right-side images input to generate intermediate images may be a maximum disparity, and the maximum disparity may be divided uniformly such that intervals among nine views are uniform.

In the event that a first view is located at a left eye and a second view adjacent to the first view is located at a right eye, a three-dimensional image may be shown normally. A disparity value between the first view and the second view may be an optimum disparity value.

Although the first view is located at the left eye, an increase in a disparity may cause a problem that the second view is not located at the right eye, and the vice versa. Alternatively, the first and second views may move away from the positions of the left and right eyes. In this case, an image overlapping phenomenon may be generated.

Figure 1:
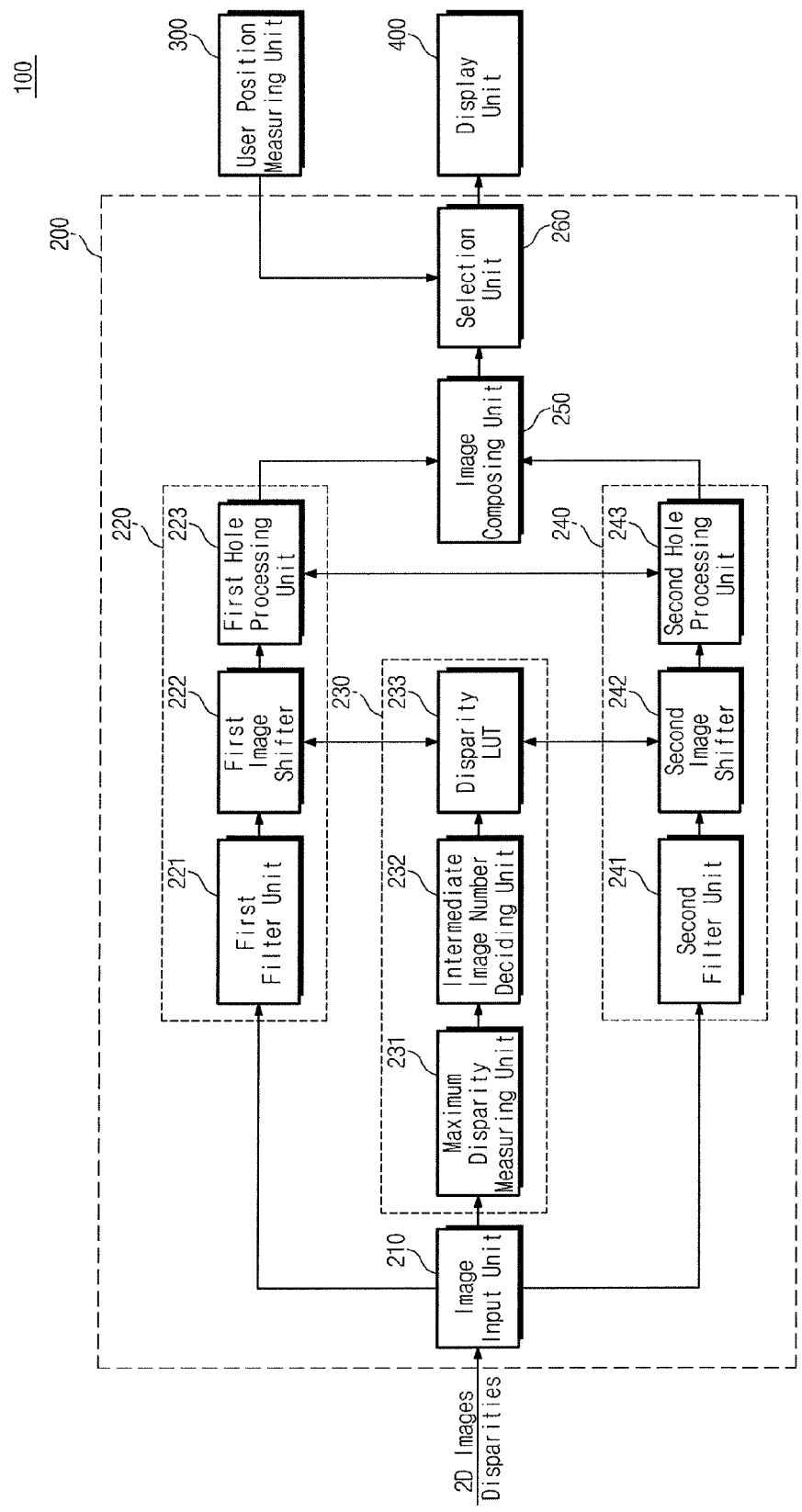
FIG. 1 is a block diagram of a 3D display device according to an embodiment of the inventive concept.
Figure 2:
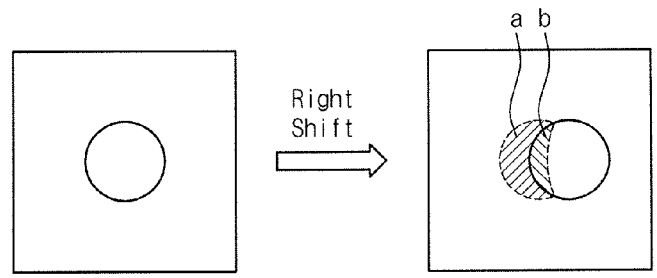
FIG. 2 is a diagram for describing a hole processing unit in FIG. 1.
Figure 3:
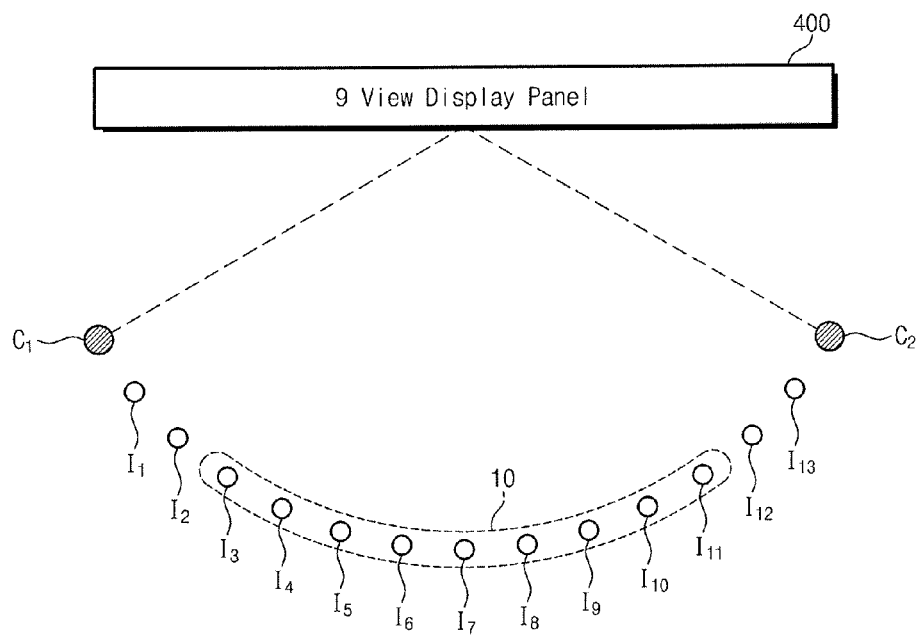
FIG. 3 is a diagram illustrating a plurality of views corresponding to a plurality of images generated by an intermediate image generating unit in FIG. 1.

FIG. 1 is a block diagram of a 3D display device according to an embodiment of the inventive concept for substantially preventing an image overlapping phenomenon. FIG. 2 is a diagram for describing a hole processing unit in FIG. 1. FIG. 3 is a diagram illustrating a plurality of views corresponding to a plurality of images generated by an intermediate image generating unit in FIG. 1.

Referring to FIG. 1, a 3D display device 100 according to the inventive concept may include an intermediate image generating unit 200, a user position measuring unit 300, and a display unit 400.

The intermediate image generating unit 200 may receive left-side and right-side two-dimensional (2D) images, for example, from two left and right cameras (not shown), and disparity information of the respective images. The intermediate image generating unit 200 may generate M images corresponding to a maximum disparity in response to the input left-side and right-side 2D images and the disparity information. The number of images generated may increase in proportion to a range of the maximum disparity. The intermediate image generating unit 200 may select images, corresponding to N views, from among the plurality of images in response to user position information provided from the user position measuring unit 300 (e.g., a device such as a camera or a laser beam). The intermediate image generating unit 200 may provide the selected images to the display unit 400, and the display unit 400 may display the selected images. Herein, M may be an integer identical to or larger than N.

For purposes of exemplary embodiments described herein, it is assumed that M is fifteen (15) and N is nine (9). It should be understood that other values of M and N may be used. In a case where M is fifteen, there may be generated thirteen (13) intermediate images other than the left-side and right-side images. In the event that N is nine, there may be selected nine images, corresponding to nine views, from among the M images.

The intermediate image generating unit 200 may include an image input unit 210, a first intermediate image generating unit 220, a shift value deciding unit 230, a second intermediate image generating unit 240, an image composing unit 250, and a selection unit 260.

The first intermediate image generating unit 220 may include a first filter unit 221, a first image shifter 222, and a first hole processing unit 223, and the second intermediate image generating unit 240 may include a second filter unit 241, a second image shifter 242, and a second hole processing unit 243. The first filter unit 221, first image shifter 222, and first hole processing unit 223 of the first intermediate image generating unit 220 may operate the same as the second filter unit 241, second image shifter 242, and second hole processing unit 243 of the second intermediate image generating unit 240.

The shift value deciding unit 230 may include a maximum disparity measuring unit 231, an intermediate image number deciding unit 232, and a disparity Look-Up Table (LUT).

The image input unit 210 of the intermediate image generating unit 200 may receive left-side and right-side 2D images and disparity information of the 2D images. The image input unit 210 may provide the input disparity information of the left-side image and disparity information of the right-side image to the maximum disparity measuring unit 231 of the shift value deciding unit 230. The image input unit 210 may provide the left-side image and the disparity information of the left-side image to the first filter unit 221 of the first intermediate image generating unit 220 and the right-side image and the disparity information of the right-side image to the second filter unit 241 of the second intermediate image generating unit 240.

The maximum disparity measuring unit 231 of the shift value deciding unit 230 may measure a maximum disparity using the disparity information of the left-side and right-side images, and may provide the measured maximum disparity to the intermediate image number deciding unit 232. The intermediate image number deciding unit 232 may decide the number of intermediate images to be generated (hereinafter referred to as the intermediate image number) in response to the maximum disparity provided from the maximum disparity measuring unit 231. The intermediate image number may increase in proportion to a range of the maximum disparity. For example, if a range of the maximum disparity increases by ten, the intermediate image number may increase by one. Table 1 shows the number of intermediate images to be generated according to the maximum disparity according to an exemplary embodiment of the present disclosure.

TABLE 1

| Maximum disparity range | Number of intermediate images |
|---|---|
| 230-255 | 21-22 |
| 210-230 | 19-20 |
| 190-210 | 17-18 |
| 170-190 | 15-16 |
| 150-170 | 13-14 |
| 130-150 | 11-12 |
| 110-130 | 9-10 |
| 90-110 | 7-8 |

It should be understood that the values shown in Table 1 are not limiting and that other ranges and numbers of images may be used.

The intermediate image number deciding unit 232 may provide the intermediate image number to the disparity LUT 233.

The disparity LUT 233 may store disparity values for generating an intermediate image number. For example, the disparity LUT 233 may include a storage device (e.g., a memory—not shown), and disparity values for generating an intermediate image number may be stored in respective storage regions of the storage device. Disparity values (hereinafter, referred to as shift values) stored in the disparity LUT 233 may be used for shifting an image by the intermediate image number at the first and second image shifters 222 and 242.

The disparity LUT 233 may select internally stored shift values in response to the intermediate image number, or information thereof provided from the intermediate image number deciding unit 232. For example, if the intermediate image number provided from the intermediate image number deciding unit 232 is thirteen, there may be selected a storage region in which shift values for generating thirteen intermediate images are stored. Shift values of the selected storage region may be shift values for shifting an image thirteen times.

The disparity LUT 233 may provide shift values to the first and second image shifters 222 and 242 in response to the disparity information provided from the first and second image shifters 222 and 242.

The first intermediate image generating unit 220 and the second intermediate image generating unit 240 may generate intermediate images for opposite images. For purposes of exemplary embodiments described herein, it is assumed that the first intermediate image generating unit 220 generates thirteen intermediate images based on a left-side image and the second intermediate image generating unit 240 generates thirteen intermediate images based on a right-side image.

The first filter unit 221 of the first intermediate image generating unit 220 may be provided with a left-side image and disparity information of the left-side image from the image input unit 210. The disparity information of the left-side image may include noise (e.g., salt and pepper noise). The first filter unit 221 may filter the noise of the disparity information of the left-side image input from the image input unit 210. The first filter unit 221 may provide filtered disparity information and the left-side image to the first image shift 222. While a case that the left-side image is provided to the first image shifter 222 via the first filter unit 221 has been described, the left-side image can be directly provided to the first image shifter 222.

The second filter unit 241 may filter noise of the disparity information of the right-side image input from the image input unit 210. The second filter unit 241 may provide the filtered disparity information and the right-side image to the second image shift 242. The right-side image can be directly provided to the second image shifter 242.

An image may be expressed as values of a plurality of pixels. Thus, disparity information may include pixel disparity information corresponding to each of the left-side and right-side images. The first image shifter 222 may provide disparity information to the disparity LUT 233. That is, pixel disparity information of the left-side and right-side images may be provided to the disparity LUT 233. The pixel disparity information of the left-side and right-side images may be provided to the disparity LUT 233 as address values. Thus, the disparity LUT 233 may provide the first image shifter 222 with shift values of a storage region of the disparity LUT 233 appointed by the address values. For example, there may be selected a storage region storing shift values corresponding to an intermediate image number of thirteen, and shift values of the appointed storage region may be provided to the first image shifter 222.

The first image shifter 222 may shift pixels of a left-side image using shift values provided from the disparity LUT 233. In a case where the intermediate image number is equal to thirteen, the first image shifter 222 may generate thirteen shifted images. The thirteen shifted images may be generated by shifting a left-side image to corresponding views. For example, the first image shifter 222 may shift the left-side image $C_1$ to thirteen views ($I_1$ through $I_{13}$ in FIG. 3) corresponding to thirteen intermediate images using shift values provided from the disparity LUT 233. That is, the first image shifter 222 may shift the left-side image $C_1$ to a right side and first through thirteenth views. The different views may be generated simultaneously. The first image shifter 222 may provide the left-side image $C_1$ and thirteen shifted images $I_1$ through $I_{13}$ to the first hole processing unit 223.

The second image shifter 242 of the second intermediate image generating unit 240 may operate substantially the same as the first image shifter 222 of the first intermediate image generating unit 220 except that a right-side image $C_2$ is shifted to a left side, and thus further description thereof may be omitted.

The first hole processing unit 223 of the first intermediate image generating unit 220 may process a hole region, or occlusion, of each of the shifted images provided from the first image shifter 222.

Herein, a hole processing unit will be more fully described with reference to FIGS. 1 and 2.

In the event that a circular image is shifted to the right, a hole region may be "a" and "b" regions. In the event that an image is shifted to the right, an image region "a" before shifting may become a hole by a shifted magnitude. In a case of expressing a circle in a three-dimensional image, it is assumed that an image is shifted to the right. With this assumption, a portion ("b" region) of the hole region may arise due to the shift of a view, which is not shown before the shift. The region "a" may be filled by the first hole processing unit 223 based on a background color. Since the region "b" also appears in an opposite image, it may be filled using the opposite image. The opposite image may be provided from the second hole processing unit 243 of the second intermediate image processing unit 240. That is, the second hole processing unit 243 may provide shifted images provided from the second image shifter 242 to the first hole processing unit 223 of the first intermediate image processing unit 220.

The second hole processing unit 243 of the second intermediate image processing unit 240 may be substantially identical to the first hole processing unit 223 of the first intermediate image processing unit 220 except that an opposite image is processed, and thus further description thereof may be omitted.

The images processed by the first hole processing unit 223 of the first intermediate image processing unit 220 and the left-side image may be provided to the image composing unit 250 as a plurality of first images. Likewise, the images processed by the second hole processing unit 243 of the second intermediate image processing unit 240 and the right-side image may be provided to the image composing unit 250 as a plurality of second images.

Herein, an image composing unit will be more fully described with reference to FIGS. 1 and 3.

Fifteen views $C_1$, $I_1$ through $I_{13}$, and $C_2$ illustrated in FIG. 3 may include a leftmost view $C_1$ corresponding to a left-side image, first through thirteenth intermediate views $I_1$ through $I_{13}$ respectively corresponding to thirteen intermediate images, and a rightmost view $C_2$ corresponding to a right-side image.

The image composing unit 250 may generate an intermediate image by composing hole processed images provided from the first hole processing unit 223 of the first intermediate image generating unit 220 and hole processed images provided from the second hole processing unit 243 of the second intermediate image generating unit 240. When generating an intermediate image corresponding to any view, the image composing unit 250 may compose images under the condition that weights are added to hole processed images in inverse proportion to a distance ratio of a leftmost view and a rightmost view on the basis of the any view.

For example, when generating an intermediate image corresponding to a first view $I_1$, the image composing unit 250 may generate an intermediate image by composing an image shifted into the first view $I_1$ from the leftmost view $C_1$ and an image shifted into the first view $I_1$ from the rightmost view $C_2$. In this case, a ratio of a distance from the leftmost view $C_1$ to the first view $C_1$ to a distance from the rightmost view $C_2$ to the first view $I_1$ may be 1:13. Accordingly, the image composing unit 250 may compose two images under the condition that a weight of $13/14$ is added with respect to an image shifted from the leftmost view $C_1$ to the first view $I_1$ and that a weight of $1/14$ is added with respect to an image shifted from the rightmost view $C_2$ to the first view $I_1$. Intermediate images corresponding to the second through thirteenth views $I_2$ through $I_{13}$ may be generated in the same manner as described above. As a result, the image composing unit 250 may generate thirteen intermediate images between the left-side image and the right-side image.

The image composing unit 250 may provide the left-side image provided from the first hole processing unit 223 of the first intermediate image generating unit 220, thirteen intermediate images, and the right-side image provided from the second hole processing unit 243 of the second intermediate image generating unit 240. That is, the image composing unit 250 may generate fifteen images to provide the fifteen images to the selection unit 260.

The display unit 400 may be formed of a nine-view display panel, which displays nine images. Accordingly, nine images need to be selected by the selection unit 260.

The selection unit 260 may select nine images, corresponding to continuous nine views, from among fifteen images provided from the image composing unit 250.

In particular, if a position of a user is measured between the leftmost view $C_1$ and the fourth intermediate view $I_4$ (within five views from the leftmost view), the selection unit 260 may select nine images, corresponding to a region from the leftmost view $C_1$ to an eighth intermediate view $I_8$, from among fifteen images.

If a position of a user is measured between the rightmost view $C_2$ and the tenth intermediate view $I_3$ (within five views from the rightmost view), the selection unit 260 may select nine images, corresponding to a region from the rightmost view $C_2$ to a sixth intermediate view $I_6$ (or, corresponding to nine views from the rightmost view), from among fifteen images.

However, if a position of a user gets out of the above-described range, that is, in the event that a position of a user is measured between a region from a fifth intermediate view $I_4$ to a ninth intermediate view $I_9$, the selection unit 260 may select nine images, corresponding to nine views from a fourth view on the left side or from a fourth view on the right side on the basis of the measured position of the user, from among fifteen images. For example, in the event that a position of a user is measured around a seventh intermediate view $I_7$, the selection unit 260 may select nine images corresponding to nine views 10 from a third intermediate view $I_3$ being a fourth view on the left or an eleventh intermediate view $I_{11}$ being a fourth view on the right on the basis of a seventh intermediate view $I_7$.

The selection unit 260 may provide the selected nine images to the display unit 400, and the display unit 400 may display images provided from the selection unit 260 to the user.

Although not shown in figures, the image composing unit 250 may be divided into two image composing units. For example, a first image composing unit of the image composing unit 250 may be provided with thirteen images and a left-side image from the first hole processing unit 223, and a second image composing unit of the image composing unit 250 may be provided with thirteen images and a right-side image from the second hole processing unit 243.

The first and second image composing units of the image composing unit 250 may exchange images. That is, the first image composing unit may compose an intermediate image using thirteen images provided from the second image composing unit. Likewise, the second image composing unit may compose an intermediate image using thirteen images provided from the first image composing unit. An intermediate image may be composed according to exemplary embodiments described herein.

Accordingly each of the first and second image composing units may provide the selection unit 260 with fifteen images including a left-side image, thirteen intermediate images, and a right-side image. The fifteen images provided to the selection unit 250 from each of the first and second image composing units may be the same image, and may correspond to a plurality of views. The selection unit 260 may select fifteen images generated by one of the first and second image composing units. As described herein, nine images selected from the fifteen images may be provided to the display unit 400.

As a result, as a maximum disparity becomes larger, the 3D display device 100 according to an exemplary embodiment of the inventive concept may increase the number of intermediate image to be generated. In view of the foregoing, it may be possible to substantially prevent disparities from becoming larger among the views provided to a user. Accordingly, the 3D display device 100 may substantially prevent an image overlapping phenomenon.

Figure 4:
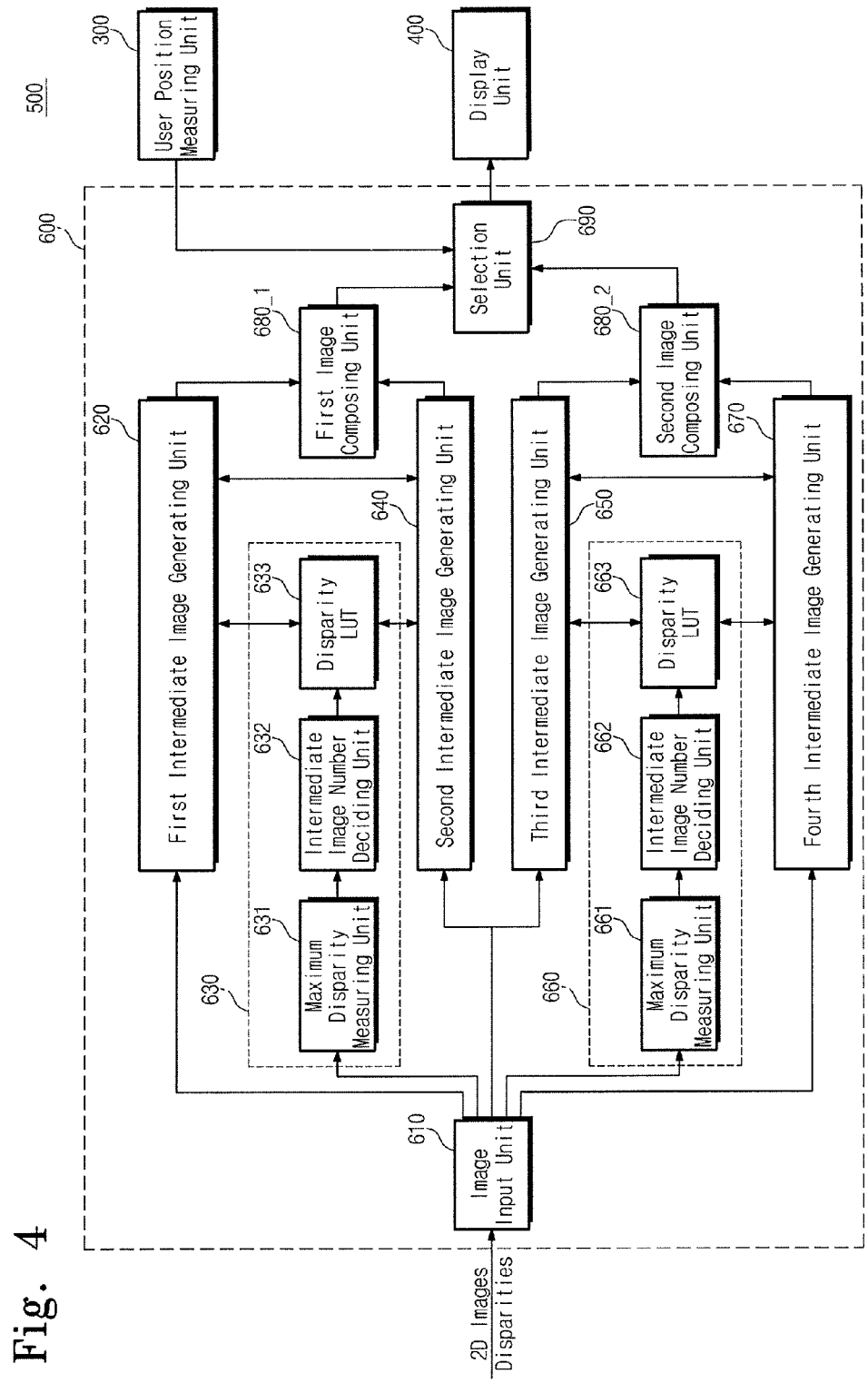
FIG. 4 is a block diagram of a 3D display device according to an embodiment of the inventive concept.

FIG. 4 is a block diagram of a 3D display device according to an exemplary embodiment of the inventive concept.

Referring to FIG. 4, a 3D display device 500 according to an exemplary embodiment of the inventive concept may include an intermediate image generating unit 600, a user position measuring unit 300, and a display unit 400. The user position measuring unit 300 and the display unit 400 may be identical to those in FIG. 1, and thus further description thereof may be omitted.

The intermediate image generating unit 600 may include an image input unit 610, a first intermediate image generating unit 620, a first shift value deciding unit 630, a second intermediate image generating unit 640, a third intermediate image generating unit 650, a second shift value deciding unit 660, a fourth intermediate image generating unit 670, a first image composing unit 680_1, a second image composing unit 680_2, and a selection unit 690. Although not shown in figures, each of the first through fourth intermediate image generating units 620, 640, 650, and 670 may be configured to include a filter unit, an image shifter, and a hole processing unit, which are described in relation to FIG. 1.

Each of the first and second shift value deciding units 630 and 640 may be identical to a shift value deciding unit 230 in FIG. 1. That is, the first shift value deciding unit 630 may include a maximum disparity measuring unit 631, an intermediate image number deciding unit 632, and a disparity LUT 633, and the second shift value deciding unit 660 may include a maximum disparity measuring unit 661, an intermediate image number deciding unit 662, and a disparity LUT 663.

The image input unit 610 of the intermediate image generating unit 600 may receive left-side, right-side, and center 2D images, and disparity information corresponding to the images. The image input unit 610 may provide the maximum disparity measuring unit 631 of the first shift value deciding unit 630 with disparity information of the left-side and center images, and may provide the maximum disparity measuring unit 661 of the second shift value deciding unit 660 with disparity information of the center and right-side images.

The image input unit 610 may provide the first intermediate image generating unit 620 with the left-side image and the disparity information of the left-side image. The image input unit 610 may provide the second and third intermediate image generating units 640 and 650 with the center image and the disparity information of the center image. The image input unit 610 may provide the fourth intermediate image generating unit 670 with the right-side image and the disparity information of the right-side image.

The maximum disparity measuring unit 631 of the first shift value deciding unit 630 may measure a maximum disparity of disparity information of the left-side and center images. The maximum disparity measuring unit 661 of the second shift value deciding unit 660 may measure a maximum disparity of disparity information of the right-side and center images. The intermediate image number deciding units 632 and 662 and disparity LUTs 633 and 663 may operate the same as the intermediate image number deciding unit 232 and the disparity LUT 233 in FIG. 1, and thus further description thereof may be omitted.

The first and second intermediate image generating units 620 and 640 may be substantially identical to first and second intermediate image generating units 220 and 240 in FIG. 1 except that left-side and center images are input, and thus further description thereof may be omitted.

The third and fourth intermediate image generating units 650 and 670 may be substantially identical to the first and second intermediate image generating units 220 and 240 in FIG. 1 except that center and right-side images are input, and thus further description thereof may be omitted.

A plurality of first images generated by the first intermediate image generating unit 620 and a plurality of second images generated by the second intermediate image generating unit 640 may be provided to the first image composing unit 680_1. A plurality of third images generated by the third intermediate image generating unit 650 and a plurality of fourth images generated by the fourth intermediate image generating unit 670 may be provided to the second image composing unit 680_2. The first and second image composing units 680_1 and 680_2 may be substantially identical to an image composing unit 250 in FIG. 1, and thus further description thereof may be omitted.

The first image composing unit 680_1 may generate intermediate images between a left-side image and a center image, and the second image composing unit 680_2 may generate intermediate images between the center image and a right-side image.

According to an exemplary embodiment of the inventive concept, it is assumed that M is seventeen (17). Fourteen (14) intermediate images other than the three images (left-side, right-side, and center images) may be generated. In particular, seven (7) intermediate images may be generated between the left-side image and the center image, and seven intermediate images may be generated between the center image and the right-side image. In this case, the first image composing unit 680_1 may generate nine images including the left-side image, the center image, and seven intermediate images between the left-side image and the center image as a plurality of fifth images. The second image composing unit 680_2 may generate nine images including the center image, the right-side image, and seven intermediate images between the center image and the right-side image as a plurality of sixth images. That is, the number of the plurality of fifth images generated by the first image composing unit 680_1 may be (M+1)/2, and the number of the plurality of sixth images generated from the second image composing unit 680_2 may be (M+1)/2.

The selection unit 690 may receive images from the first and second image composing units 680_1 and 680_2. The selection unit 690 may select nine images, corresponding to nine continuous views, from among seventeen images other than a duplicated center image of the input images, according to user position information.

Figure 5:
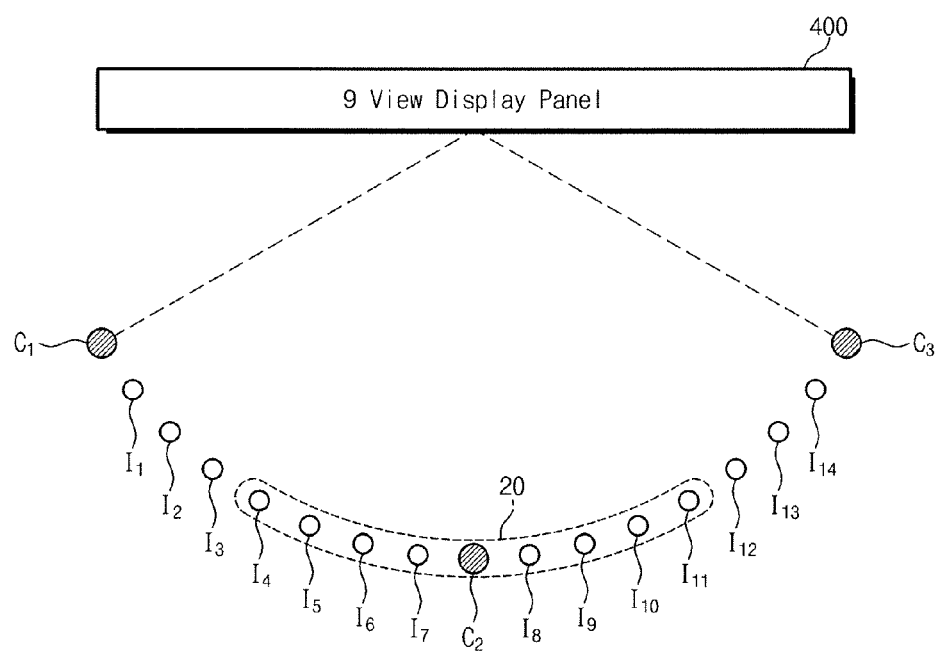
FIG. 5 is a diagram illustrating a plurality of views corresponding to a plurality of images generated from an intermediate image generating unit in FIG. 4.

FIG. 5 is a diagram illustrating a plurality of views corresponding to a plurality of images generated from an intermediate image generating unit in FIG. 4.

A plurality of views illustrated in FIG. 5 may correspond to views when seven intermediate images are generated according to a maximum disparity between a left-side image and a center image and seven intermediate images are generated according to a maximum disparity between a right-side image and the center image. In particular, seventeen views $C_1$, $I_1$ through $I_7$, $C_2$, $I_8$ through $I_{14}$, and $C_3$ illustrated in FIG. 5 may be formed of a leftmost view $C_1$ corresponding to a left-side image, first through seventh intermediate views $I_1$ through $I_7$ corresponding to seven intermediate images generated between the left-side image and the center image, a center view $C_2$ corresponding to the center image, eighth through fourteen intermediate views $I_8$ through $I_{14}$ corresponding to seven intermediate images generated between the center image and the right-side image, and a rightmost view $C_3$ corresponding to the right-side image.

Images corresponding to the leftmost view $C_1$, the first through seventh intermediate views $I_1$ through $I_7$, and the center view $C_2$ may be provided to the first image composing unit 680_1. Images corresponding to the center view $C_2$, the eighth through fourteen intermediate views $I_8$ through $I_{14}$, and the leftmost view $C_1$ may be provided to the second image composing unit 680_2.

Referring to FIG. 5, the selection unit 690 may select nine images, corresponding to nine continuous views 20, from among seventeen images according to user position information input from the user position measuring unit 300.

In particular, if a position of a user is measured between the leftmost view $C_1$ and the fourth intermediate view $I_4$, the selection unit 690 may select nine images corresponding to nine views between the leftmost view $C_1$ and a center view $C_2$. If a position of a user is measured between the rightmost view $C_3$ and the eleventh intermediate view $I_{11}$, the selection unit 690 may select nine images corresponding to nine views between the rightmost view $C_3$ and the center view $C_2$.

In the event that a position of a user is measured between a fifth intermediate view $I_4$ and a tenth intermediate view $I_{10}$ including a center view $C_2$, there may be selected nine images corresponding to nine views from a fourth view on the left side or a fourth view on the right side on the basis of the measured view. For example, if a position of a user is measured around the center view $C_2$, the selection unit may select nine images corresponding to nine views from the fourth intermediate view $I_4$ being the fourth view on the left side or the eleventh intermediate view $I_{11}$ being the fourth view on the right side on the basis of the center view $C_2$.

As a result, as a maximum disparity becomes larger, the 3D display device 600 according to an exemplary embodiment of the inventive concept may increase the number of intermediate images to be generated. In view of the foregoing, it may be possible to substantially prevent disparities from becoming larger among the views provided to a user. Accordingly, the 3D display device 600 may prevent an image overlapping phenomenon.

Figure 6:
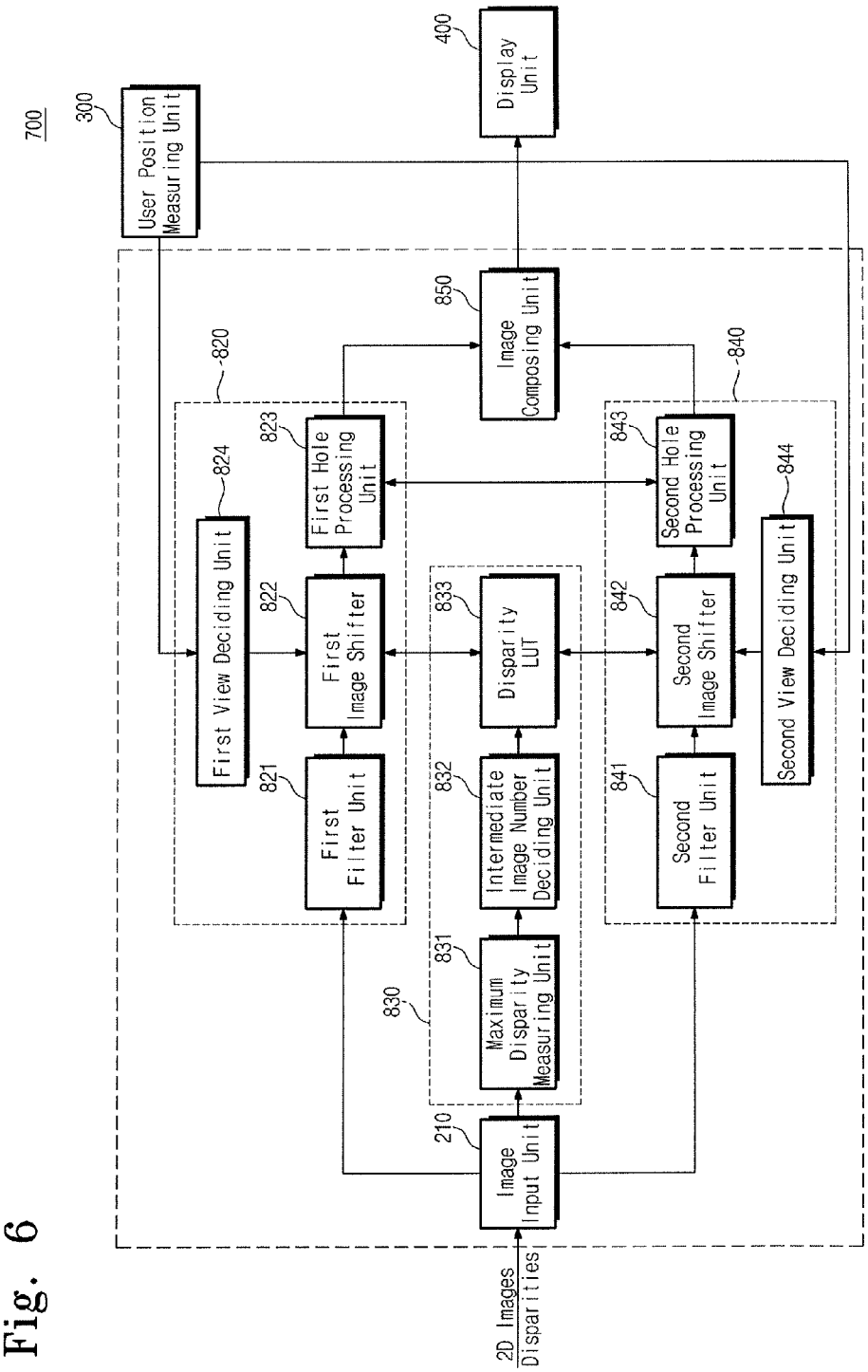
FIG. 6 is a block diagram of a 3D display device according to an embodiment of the inventive concept.

FIG. 6 is a block diagram of a 3D display device according to an exemplary embodiment of the inventive concept.

A 3D display device 700 illustrated in FIG. 6 is substantially similar to a 3D display device 100 in FIG. 1 except that a selection unit is not included and first and second view deciding units 824 and 844 are further included. Accordingly, the 3D display device will be described on the basis of the first and second view deciding units 824 and 844. For purposes of describing FIG. 6, according to an exemplary embodiment of the inventive concept, it is assumed that M and N are set to the same value, for example, nine.

Referring to FIG. 6, the first view deciding unit 824 of a first intermediate image generating unit 820 may receive user position information from a user position measuring unit 300. The first view deciding unit 824 may generate nine-view information in response to user position information to provide the nine-view information to an image shifter 822. The image shifter 822 may generate nine images corresponding to nine views via a shift operation in response to the nine-view information. That is, although supplied with thirteen intermediate images from the disparity LUT 833 of a shift value deciding unit 830, the image shifter 822 may generate nine images corresponding to nine views by shifting an image nine times according to nine-view information supplied from the first view deciding unit 824. Accordingly, the first intermediate image generating unit 820 may provide the image composing unit 850 with nine images as a plurality of first images.

The second intermediate image generating unit 840 may operate the same as the first intermediate image generating unit 820. Accordingly, the second intermediate image generating unit 840 may provide the image composing unit 850 with nine images as a plurality of second images. The image composing unit 850 may generate nine images as a plurality of third images using the input images, and may provide the nine images to the display unit 400.

As a result, since user position information is provided, the 3D display device 700 may generate images corresponding to nine views to be displayed without generating a number of intermediate images decided by an intermediate image number deciding unit 832 corresponding to a maximum disparity determined by a maximum disparity measuring unit 831.

The first and second filter units 821 and 841 may be substantially identical to first and second filter units 221 and 241 in FIG. 1, and thus further description thereof may be omitted.

The first and second hole processing units 823 and 843 may be substantially identical to first and second hole processing units 223 and 243 in FIG. 1, and thus further description thereof may be omitted.

Figure 7:
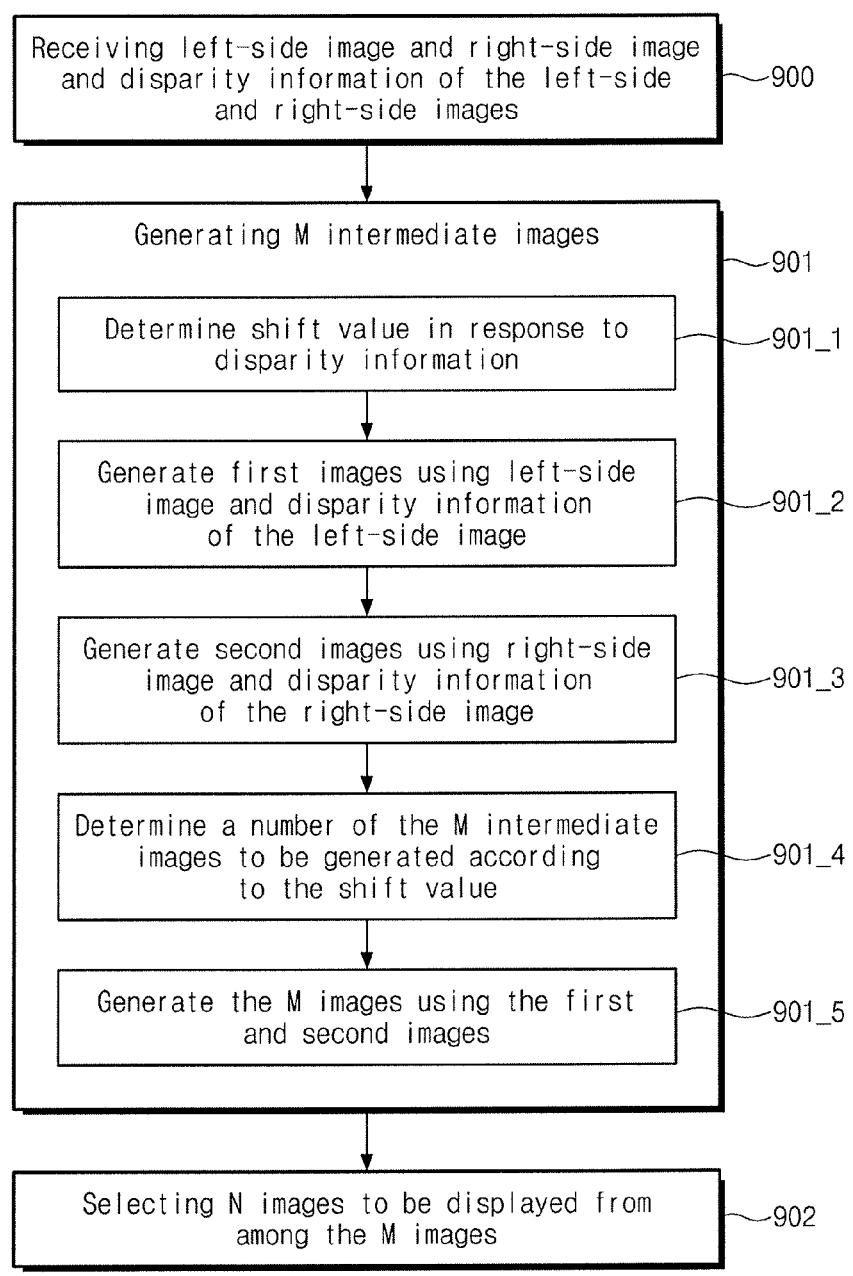
FIG. 7 is a flow diagram of a method for displaying a three-dimensional (3D) image.

Referring to FIG. 7, a method for displaying a three-dimensional (3D) image comprises receiving a plurality of two-dimensional (2D) images and disparity information of the respective 2D images (900), generating M intermediate images corresponding to a maximum disparity in response to the plurality of 2D images and the disparity information of the respective 2D images (901), and selecting N images to be displayed from among the M images (902).

According to an exemplary embodiment, selecting N images to be displayed from among the M images (902) further includes measuring a user position, wherein the N images are selected in response to the user position.

According to an exemplary embodiment, the plurality of 2D images comprise a left-side image and a right-side image, and generating M intermediate images (901) includes determining a shift value in response to the disparity information of the respective left-side and right-side images (901_1), generating a plurality of first images using the left-side image and the disparity information of the left-side image and the shift value (901_2), generating a plurality of second images using the right-side image and the disparity information of the right-side image and the shift value (901_3), determining a number of the M intermediate images to be generated according to the shift value (901_4), and generating the M images using the plurality of first images and the plurality of second images (901_5).

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A method for displaying a three-dimensional (3D) image in a display panel of a 3D display device comprising:
generating M images corresponding to a maximum disparity in response to received two-dimensional (2D) images including left-side and right-side images and disparity information of the respective left-side and right-side images,
selecting N images from among the M images;
providing the selected N images to the display panel; and
displaying the provided N images using the display panel,
wherein the generating of the M images comprises:
determining a number of intermediate images that is proportional to a range of the maximum disparity;
generating a plurality of first images using the left-side image and a shift value corresponding to the number of intermediate images;
generating a plurality of second images using the right-side image and the shift value corresponding to the number of intermediate images; and
generating the M images using the plurality of first images and the plurality of second images.

2. The method of claim 1, further comprising:
measuring a user position, wherein the selecting of the N images is performed in response to the user position.

3. The method of claim 2, wherein the generating of the M images further comprises:
receiving the 2D images and the disparity information of the respective left-side and right-side images; and
determining a shift value in response to the disparity information of the respective left-side and right-side images.

4. The method of claim 3, wherein the determining of the shift value comprises:
measuring the maximum disparity in response to the disparity information of the left-side and right-side images;
determining the number of intermediate images to be generated in response to the maximum disparity; and
storing the shift value corresponding to the number of intermediate images to be generated.

5. The method of claim 4, wherein the generating of the plurality of first images comprises:
filtering a noise of the disparity information of the left-side image;
shifting the left-side image by the number of intermediate images in response to the shift value; and
performing a hole processing on a hole of the shifted left-side image,
wherein the generating of the plurality of second images comprises:
filtering a noise of the disparity information of the right-side image;
shifting the right-side image by the number of intermediate images in response to the shift value; and
performing a hole processing on a hole of the shifted right-side image.

6. The method of claim 5, wherein the performing of the hole processing on the hole of the shifted left-side image is performed using an image background color and the shifted right-side image.

7. The method of claim 5, wherein the performing the hole processing on the hole of the shifted right-side image is performed using an image background color and the shifted left-side image.

8. The method of claim 5, wherein the plurality of first images includes the left-side image and images obtained by the first performing of the hole processing on the hole of the shifted left-side image.

9. The method of claim 5, wherein the plurality of second images includes the right-side image and images obtained by the second performing of the hole processing on the hole of the shifted right-side image.

10. The method of claim 5, wherein the M images are generated using the left-side and right-side images, and images obtained by the first performing of the hole processing on the hole of the shifted left-side image and the second performing of the hole processing on the hole of the shifted right-side image.

11. The method of claim 1, wherein a value of M is greater than or equal to a value of N.

12. The method of claim 1, wherein a value of M is 15 and a value of N is 9.

13. The method of claim 12,
wherein the selected 9 images correspond to 9 continuous views from a leftmost view corresponding to the left-side image, from among the 15 images upon determining that the user position is measured within five views from the leftmost view.

14. The method of claim 12,
wherein the selected 9 images correspond to 9 continuous views from a rightmost view corresponding to the right-side image, from among the 15 images upon determining that the user position is measured within five views from the rightmost view.

15. The method of claim 12,
wherein the selected 9 images correspond to 9 continuous views from a fourth view on the left side or a fourth view on the right side on the basis of the user position, from among the 15 images upon determining that the user position is measured at a view greater than five views from a leftmost view corresponding to the left-side image and greater than five views from a rightmost view corresponding to the right-side image.

16. The method of claim 12,
wherein the generating of the M images comprises:
receiving the 2D images including a left-side image, a right-side image, and a center image, and disparity information of the respective left-side, right-side, and center images;
determining a first shift value in response to the disparity information of the respective left-side and center images;
determining a second shift value in response to the disparity information of the respective right-side and center images;
generating a plurality of first images using the left-side image and the disparity information of the left-side image and the first shift value;
generating a plurality of second images using the center image and the disparity information of the center image and the first shift value;
generating a plurality of third images using the center image and the disparity information of the center image and the second shift value;
generating a plurality of fourth images using the right-side image and the disparity information of the right-side image and the second shift value;
generating a plurality of fifth images using the plurality of first images and the plurality of second images;
generating a plurality of sixth images using the plurality of third images and the plurality of fourth images;
receiving the plurality of fifth images and the plurality of sixth images; and selecting the N images from among the M images other than a duplicated image of the input images, according to the user position, wherein the N images correspond to N continuous views.

17. The method of claim 10, wherein one image of the M images is generated by composing one of the plurality of first images and one of the plurality of second images, and weights are given to the hole-processed left-side image or the hole-processed right-side image in inverse proportion to a ratio of a distance between a particular view corresponding to the one image and a leftmost view and a distance between the particular view and a rightmost view.

18. The method of claim 1, wherein the number of intermediate images is increased by one when the range of the maximum disparity is increased by ten.

* * * * *